(12) United States Patent
Ito et al.

(10) Patent No.: US 7,917,918 B2
(45) Date of Patent: Mar. 29, 2011

(54) BRUSHLESS MOTOR HAVING CHUCKING MECHANISM, AND DISK DRIVING DEVICE HAVING THE BRUSHLESS MOTOR

(75) Inventors: Haruhiko Ito, Kyoto (JP); Toshihide Sonoda, Kyoto (JP); Takuya Yamane, Kyoto (JP)

(73) Assignee: Nidec Corporation, Kyoto (JP)

( * ) Notice: Subject to any disclaimer, the term of this patent is extended or adjusted under 35 U.S.C. 154(b) by 894 days.

(21) Appl. No.: 11/765,493

(22) Filed: Jun. 20, 2007

(65) Prior Publication Data

US 2007/0294712 A1 Dec. 20, 2007

(30) Foreign Application Priority Data

Jun. 20, 2006 (JP) .................................. 2006-170761

(51) Int. Cl.
*G11B 17/028* (2006.01)
*G11B 19/20* (2006.01)
*H02K 7/04* (2006.01)
*H02K 5/24* (2006.01)

(52) U.S. Cl. .......... 720/706; 720/702; 310/67 R; 310/51

(58) Field of Classification Search ................ 310/67 R, 310/51; 720/706, 701, 702
See application file for complete search history.

(56) References Cited

U.S. PATENT DOCUMENTS

| 4,705,279 | A | 11/1987 | Mizukami et al. | 279/2.02 |
|---|---|---|---|---|
| 4,786,997 | A | 11/1988 | Funabashi et al. | 720/705 |
| 4,841,517 | A | 6/1989 | Kurihara et al. | 720/723 |
| 5,646,934 | A | 7/1997 | Mizuno et al. | 720/696 |
| 5,751,688 | A | 5/1998 | Mizuno et al. | |
| 6,118,747 | A | 9/2000 | Van Rosmalen | |
| 6,208,613 | B1 | 3/2001 | Iizuka | |
| 6,353,591 | B1 * | 3/2002 | Kato | 720/667 |
| 7,015,611 | B2 | 3/2006 | Tokunaga et al. | 310/90 |
| 7,461,391 | B2 * | 12/2008 | Yoo | 720/702 |
| 2001/0038250 | A1 | 11/2001 | Katagiri et al. | 310/67 R |
| 2002/0084704 | A1 | 7/2002 | Fukutani et al. | 310/67 R |
| 2004/0154036 | A1 | 8/2004 | Saito | 720/697 |
| 2004/0232781 | A1 | 11/2004 | Yoo | |
| 2005/0223400 | A1 * | 10/2005 | Matsushita et al. | 720/702 |

(Continued)

FOREIGN PATENT DOCUMENTS

CN 1233828 A 11/1999

(Continued)

OTHER PUBLICATIONS

Amendment Under 1.111 filed on Nov. 8, 2010 in U.S. Appl. No. 11/753,981, pp. 1-17 along with 9 sheets of replacement drawings.

(Continued)

*Primary Examiner* — Julie Anne Watko
(74) *Attorney, Agent, or Firm* — Westerman, Hattori, Daniels & Adrian, LLP (57) ABSTRACT

A space for accommodating therein a portion of an optical pickup mechanism is arranged below a disk loading portion of a turn table member of a chucking mechanism of the present invention. The space is arranged axially below a disk mounting surface. Since such space is provided, a recording/reproducing portion will be allowed to move closer to a brushless motor, and therefore a second lens arranged further away from the brushless motor will be allowed to move radially inward of a recording/reproducing area of an optical disk.

23 Claims, 10 Drawing Sheets

U.S. PATENT DOCUMENTS

| | | |
|---|---|---|
| 2006/0022621 A1 | 2/2006 | Mine et al. |
| 2006/0087184 A1 | 4/2006 | Kuyama et al. ............... 310/90 |
| 2006/0284497 A1 | 12/2006 | Takaki et al. ................. 310/51 |
| 2007/0013239 A1 | 1/2007 | Park ............................... 310/51 |
| 2007/0028255 A1 | 2/2007 | Ito et al. ....................... 720/706 |
| 2007/0061827 A1 | 3/2007 | Dupper et al. ............... 720/695 |
| 2007/0150911 A1* | 6/2007 | Kim ............................. 720/702 |
| 2007/0277189 A1 | 11/2007 | Yasumito et al. ............ 720/710 |

FOREIGN PATENT DOCUMENTS

| | | |
|---|---|---|
| CN | 1585013 A | 2/2005 |
| JP | 61-28138 U | 2/1986 |
| JP | 63-65154 U | 4/1988 |
| JP | 63-72750 U | 5/1988 |
| JP | 63-168653 U | 11/1988 |
| JP | 63-195654 U | 12/1988 |
| JP | 6-33569 Y2 | 8/1994 |
| JP | 7-18044 Y2 | 4/1995 |
| JP | 07-336929 A | 12/1995 |
| JP | 09-182362 A | 7/1997 |
| JP | 10-134462 A | 5/1998 |
| JP | 11-4568 A | 1/1999 |
| JP | 11-004568 A | 1/1999 |
| JP | 2000-083346 A | 3/2000 |
| JP | 2000-83346 A | 3/2000 |
| JP | 2000-90557 A | 3/2000 |
| JP | 2000-090577 A | 3/2000 |
| JP | 2000-113544 A | 4/2000 |
| JP | 2000-187930 A | 7/2000 |
| JP | 2000-200454 A | 7/2000 |
| JP | 2000-285557 A | 10/2000 |
| JP | 2002-061636 A | 2/2002 |
| JP | 2002-148134 A | 5/2002 |
| JP | 2002-333053 A | 11/2002 |
| JP | 2002-343017 A | 11/2002 |
| JP | 2003-36584 A | 2/2003 |
| JP | 2003-036584 A | 2/2003 |
| JP | 2004-30744 A | 1/2004 |
| JP | 2004-64865 A | 2/2004 |
| JP | 2004-064865 A | 2/2004 |
| JP | 2004-079111 A | 3/2004 |
| JP | 2004-110919 A | 4/2004 |
| JP | 2004-234773 A | 8/2004 |
| JP | 2006-50738 A | 2/2006 |
| JP | 2006-050738 A | 2/2006 |
| JP | 2006-149052 A | 6/2006 |

OTHER PUBLICATIONS

Notice of Allowance and Fees Due dated Dec. 14, 2010, issued in U.S. Appl. No. 11/753,981, pp. 1-14.

Final Office Action dated Dec. 9, 2010, issued in U.S. Appl. No. 11/491,965, pp. 1-9.

Amendment under 37 CFR 1.111 dated Jun. 2, 2010 filed in response to US Office Action dated Mar. 8, 2010, issued in U.S. Appl. No. 11/491,965, pp. 1-23 along with 2 sheets of replacement drawings.

Chinese Office Action dated Nov. 27, 2009 issued in Chinese Application No. 200610107859.8.

Chinese Office Action dated Nov. 30, 2007 issued in Chinese Application No. 200610107859.8.

Supplemental Amendment under 37 CFR 1.111 dated Sep. 22, 2010 filed in response to US Office Action dated Mar. 8, 2010 issued in U.S. Appl. No. 11/491,965, pp. 1-20.

US Office Action dated Mar. 8, 2010, issued in corresponding U.S. Appl. No. 11/491,965.

U.S. Appl. No. 11/735,981, Yasumoto et al., filed on May 25, 2007.

U.S. Appl. No. 11/491,965, Ito et al., filed on Jul. 25, 2006.

* cited by examiner

BRUSHLESS MOTOR HAVING CHUCKING MECHANISM, AND DISK DRIVING DEVICE HAVING THE BRUSHLESS MOTOR

BACKGROUND OF THE INVENTION

1. Field of the Invention

The present invention relates to a brushless motor having therein a chucking mechanism allowing an optical disk to be detachably placed thereon, and to a disk driving device having therein the brushless motor.

2. Description of the Related Art

In recent years, due to a very high speed rotation of an optical disk such as CDs and DVDs, when a mechanism for rotating the disk has a balance problem, the disk may vibrate severely. The vibration may cause a problem when recording data on the disk or reproducing data from the disk. Therefore, a brushless motor having a balance correction feature has been developed.

Figure 7:
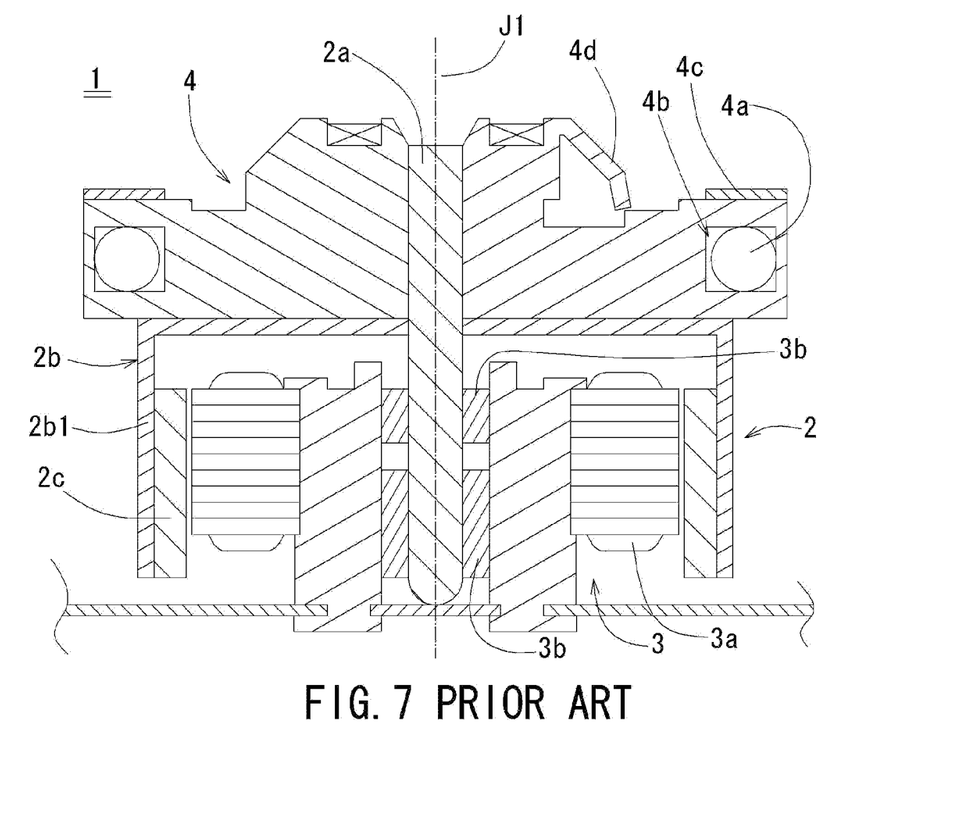
FIG. 7 is a cross sectional view of an embodiment of the conventional brushless motor.

FIG. 7 indicates a conventional brushless motor 1 having the balance correction feature. According to FIG. 7, the brushless motor 1 includes a shaft 2a which rotates along the central axis J1, a rotor portion 2 having therein a rotor holder 2b of a substantially cylindrical shape affixed to the shaft 2a and a rotor magnet 2c affixed to an inner circumferential surface of a cylindrical portion 2b1 of the rotor holder 2b, a stator portion 3 including a stator 3a arranged opposing in a radial direction to the rotor magnet 2c and a bearing portion 3b affixed to an inner circumferential surface of the stator 3a for rotatably supporting the shaft 2a, and a chucking mechanism 4 having an accommodating portion 4b accommodating therein the balance member 4a. Also, a disk mounting surface 4c is formed on an outer circumferential surface of the chucking mechanism 4 on which an optical disk (not shown in FIG. 7) is placed. Also, a plurality of aligning claws 4d are formed at a central portion of the chucking mechanism 4 wherein the aligning claws 4d make contact with an inner circumferential surface of a central opening portion of the optical disk in order to align the optical disk with a rotational center of the brushless motor 1. The plurality of the aligning claws 4d are arranged in a circumferential manner evenly apart from one another.

Currently due to lack of standardization for different types of high density optical disks (e.g., HD-DVD, Blu-ray), each type of optical disk requires a specific optical pickup mechanism. In order to use different types of optical disks each having a unique standard, at least two lenses arranged in a radial direction each emitting an optical disk will be needed for the optical pickup mechanism. By virtue of such configuration of the optical pickup mechanism, when one of the at least two lenses arranged further away from a brushless motor is at an area corresponding to, with respect to the optical disk, a radially innermost recordable/reproducible area of the disk, the other lens (i.e., nearer to the brushless motor) will be positioned furthermore inward of recordable/reproducible area of the disk.

However, the balance member 4a and the accommodating portion 4b of the chucking mechanism 4 in the brushless motor 1 are arranged such that they are axially overlapping with the disk mounting surface 4c. By such configuration, a pickup mechanism (not shown) for recording data on the optical disk and reproducing data from the optical disk will move further inward of the disk mounting surface 4c, and therefore, the accommodating portion 4b of the chucking mechanism 4 will interfere with the pickup mechanism. That is to say that the lens arranged further away from the brushless motor will not be able to record data on the optical disk or reproduce data from the optical disk at the recordable/reproducible inner most area of the disk.

Also, since optical disks are sometimes rotated at approximately 1,000 rpm while recording data on the disk and/or reproducing data from the disk, a slight unbalance in the rotation thereof may centrifugally affect the aligning claws 4d. Since the aligning claws 4 make contact with the central opening portion of the disk at a small portion thereof, the disk is not securely retained by the aligning claws 4. Therefore, when the disk is rotated at a very high speed and a centrifugal force becomes stronger than the force with which the aligning claws 4 retain the disk, a misalignment of the disk occurs which causes a vibration problem of the brushless motor.

SUMMARY OF THE INVENTION

According to a brushless motor having a chucking mechanism of the present invention includes a shaft, and a rotor holder having a flat lid portion. The chucking mechanism is arranged on a top surface of the lid portion of the rotor holder.

Also, the chucking mechanism includes a cone shaped member having a slidable portion of a substantially cylindrical shape having an inner circumferential surface which is slidable with respect to the shaft, and a disk contacting portion arranged radially outward of the slidable portion for making contact with the central opening portion of the optical disk, a turn table member having a disk mounting surface making contact with a bottom surface of the optical disk, a hollow portion arranged axially below the disk mounting surface, having a substantially annular shape with an opening facing downward, a inner circumferential wall and an outer circumferential wall, and at least one balance member accommodated in the hollow portion, an elastic member arranged at an axial space between the turn table member and the cone shaped member, retaining an axial position of the cone shaped member, and a yoke member arranged axially above the slidable portion restricting axial movement of the cone shaped member, and an outer circumferential surface of the outer circumferential wall is arranged radially at a same position as the cylindrical portion or radially inward of the cylindrical portion.

According to a conventional motor having a plurality of aligning claws circumferentially arranged for making contact with a portion of the central opening portion of the optical disk so as to retain the optical disk, when the rotation of the motor reaches approximately 6,000 rpm, the centrifugal force imposed on the optical disk becomes greater than the retaining strength of the aligning claws which causes misalignment of the optical disk. On the other hand, the cone shaped member of the present invention makes contact with a substantially entire central opening portion of the optical disk and therefore, the retaining strength retaining the optical disk is improved and the problem concerning the misalignment of the optical disk will be minimized.

Also, the brushless motor of the present invention includes a hollow portion at an area radially inward of the disk mounting surface, and the hollow portion includes an inclined surface at a radially inward portion. The inclined surface is arranged so as to assure a smooth flow of the resin material when forming the brushless motor.

Other features, elements, steps, characteristics and advantages of the present invention will become more apparent from the following detailed description of preferred embodiments thereof with reference to the attached drawings.

DETAILED DESCRIPTION OF PREFERRED EMBODIMENT

Structure of Brushless Motor

Note that in the description of a preferred embodiment of the present invention herein, words such as upper, lower, left, right, upward, downward, top and bottom for describing positional relationships between respective members and directions merely indicate positional relationships and directions in the drawings. Such words do not indicate positional relationships and directions of the members mounted in an actual device. Also note that reference numerals, figure numbers and supplementary descriptions are shown below for assisting the reader in finding corresponding components in the description of the preferred embodiment below to facilitate the understanding of the present invention. It is understood that these expressions in no way restrict the scope of the present invention. Note that reference numerals, figure numbers and supplementary explanations are shown in parentheses below for assisting the reader in finding corresponding components in the description of a preferred embodiment below to facilitate the understanding of the present invention. It is understood that these parenthetic expressions are in no way intended to restrict the scope of the invention.

Figure 1:
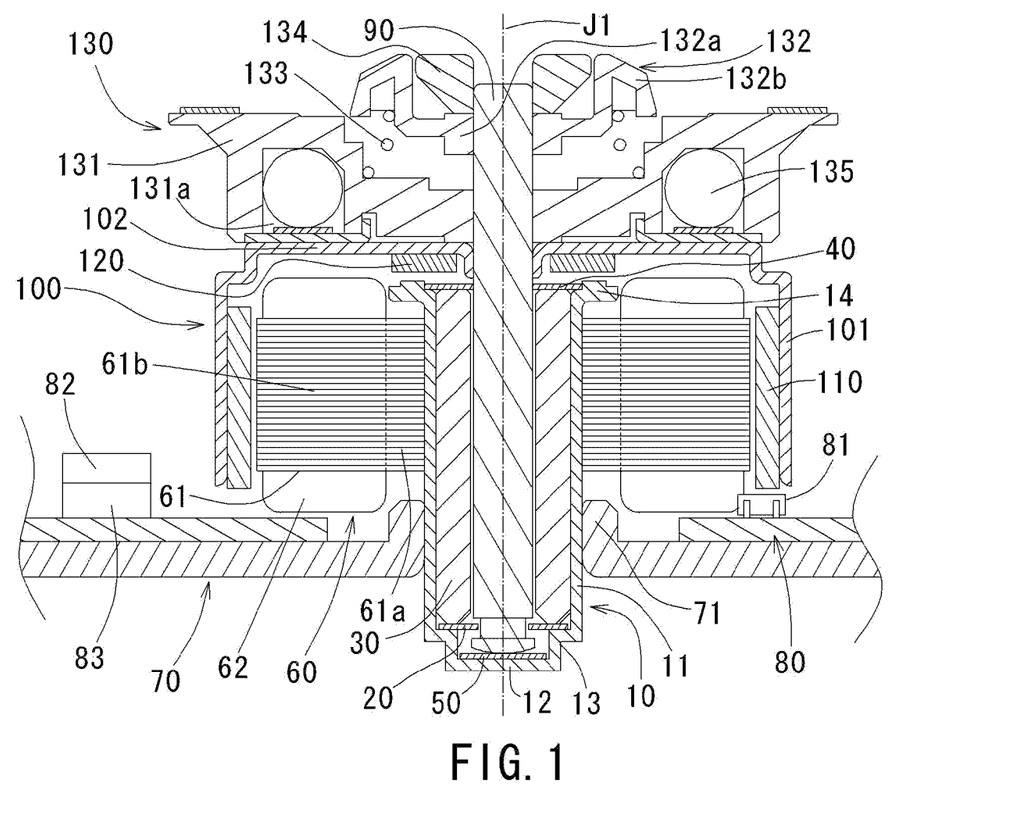
FIG. 1 is a schematic cross sectional view of a brushless motor according to a preferred embodiment of the present invention.

Hereinafter, a structure of the brushless motor according to the preferred embodiment of the present invention will be described with reference to FIG. 1. FIG. 1 is a cross sectional view of the brushless motor according to the preferred embodiment of the present invention.

Hereinafter, a stator portion of the brushless motor will be described with reference to FIG. 1.

A housing 10 formed by a deformation process (e.g., pressing) performed on a steel plate includes a cylindrical portion 11 concentric with a central axis J1 extending in an axial direction, a bottom surface portion 12 arranged at a bottom end of a cylindrical portion 11 for closing the cylindrical portion 11. The housing 10 has an opening at an axially top end thereof. A step portion 13 is arranged at a connecting portion between the cylindrical portion 11 and the bottom surface portion 12 in the housing 10. A washer 20 of an annular shape made of a resin material is arranged on a top surface of the step portion 13. A substantially cylindrically shaped sleeve 30 is arranged attached to a top surface of the washer 20 and to an inner circumferential surface of the cylindrical portion 11 of the housing 10. The sleeve 30 is a sintered object impregnated with oil. A washer 40 is arranged on a top surface of the sleeve 30 so as to prevent an oil leakage via a top portion of the sleeve 30. A thrust plate 50 made of a resin material having a superior abrasion quality and slidability is arranged on a top surface of the bottom surface portion 12. Also, a radially extending portion 14 extending in the radial direction is arranged on a top end of the cylindrical portion 11.

A stator 60 is arranged on an outer circumferential surface of the cylindrical portion 11. The stator 60 includes: a plurality of stator cores 61 each having a core back portion 61a of an annular shape made of a thin plate and a plurality of tooth portions 61b each extending in the radial direction and arranged evenly apart from one another in a circumferential direction, wherein the plurality of stator cores 61 each are flat-rolled magnetic steel sheet laminated on top of another in the axial direction to form a layer thereof; an insulating coating (not shown) arranged on a surface of the stator core 61; and a coil 62 formed by winding a multiple layers of wire around each tooth portion 61b.

Also, an attachment board 70 formed by a deformation process (e.g., pressing) performed on a steel plate is arranged on an outer circumferential surface of the housing 10 axially below the stator 60. The attachment board 70 includes an attachment portion 71 of a substantially cylindrical shape is arranged at a portion thereof making contact with the outer circumferential surface of the cylindrical portion 11. A circuit board 80 is arranged on a top surface of the attachment board 70 via an insulating layer (not shown) in order to electrically insulate one from another. On the circuit board 80, a plurality of Hall elements 81 (3 in the present embodiment) are arranged in the circumferential direction as a detection means for a high speed rotation. As a detection means for a low speed rotation, an optical element 82 is arranged. The optical element 82 is arranged axially on top of a resin layer 83 arranged on top of the circuit board 80. The optical element 82 is arranged radially outward of the Hall element 81. The optical element 82 detects a pattern formation portion (not shown) arranged radially inward of the recording/reproducing portion of the optical disk in order to detect the rotation of the optical disk.

Hereinafter, a rotor portion of the brushless motor will be described.

A shaft 90 concentric with the central axis J1 is inserted into the sleeve 30 and is rotatably supported by the inner circumferential surface of the sleeve 30. A rotor holder 100 formed by a deformation process (e.g., pressing) performed on a steel plate is affixed to the shaft 90 at a portion thereof axially above the sleeve 30. The rotor holder 100 includes a flat lid portion 102 radially extending outward of the shaft 90, and a cylindrical portion 101 extending in the axially downward direction from a radially outer area of the lid portion 102. The rotor holder 100 surrounds the stator 60. A rotor magnet 110 is arranged at an inner circumferential surface of the cylindrical portion 101. The rotor magnet 110 is arranged facing an outer circumferential surface of the tooth portions 61b via a gap therebetween. A pressuring magnet 120 is arranged at a bottom facing surface of the lid portion 102 and axially facing the radially extending portion 14.

Hereinafter, a chucking mechanism 130 will be described.

The chucking mechanism 130 includes: a turn table member 131 of a substantially cylindrical shape made of a resin material arranged on the top surface of the lid portion 102; a cone shaped member 132 made of a resin material having a slidable portion 132a of a substantially cylindrical shape sliding with the shaft 90 and arranged axially above the turn table member 131, and a disk contacting portion 132b contacting with an optical disk (not shown); an elastic member 133 (coiled spring in the present embodiment) arranged at a space between the turn table member 131 and the cone shaped member 132 for retaining an axial position of the cone shaped member 132; and a yoke member 134 which is a magnetic substance arranged to restrict an axial movement of the cone shaped member 132.

A hollow portion 131a of a substantially annular shape is arranged at a radially outward portion of the turn table member 131. A balance member 135 (a plurality of steel balls in the present embodiment) is arranged at the hollow portion 131a.

Structure of Chucking Mechanism and Rotor Portion

Figure 2:
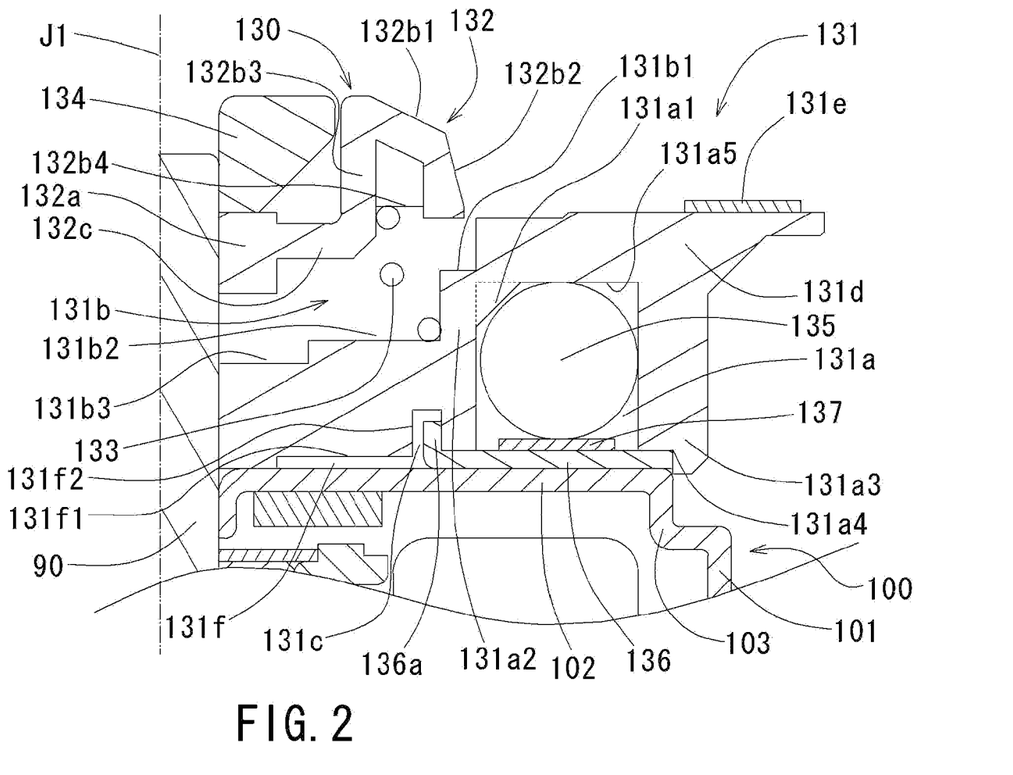
FIG. 2 is an enlarged and cross sectional view of a chucking mechanism and an upper portion of a rotor portion of the brushless motor according to the preferred embodiment of the present invention.
Figure 3:
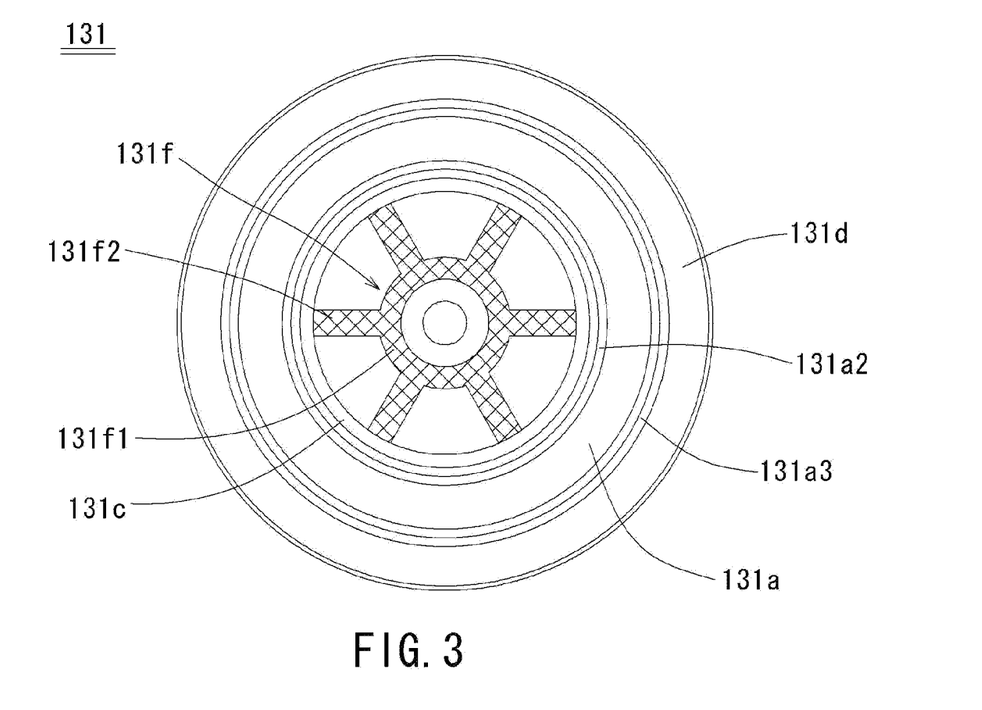
FIG. 3 is plan view of a turn table member of the brushless motor as seen from below according to the preferred embodiment of the present invention.

Hereinafter, a detailed structure of the chucking mechanism 130 and that of the rotor portion according to the preferred embodiment of the present invention will be described with reference to FIGS. 2 and 3. FIG. 2 is an enlarged cross sectional view of the chucking mechanism 130. FIG. 3 is a plan view of a turn table member as seen from below according to the preferred embodiment of the present invention.

According to FIG. 2, an indented receiving portion 131b for receiving a portion of the cone shaped member 132 is arranged at a center of the turn table member 131 of the chucking mechanism. The indented receiving portion 131b includes a first accommodating portion 131b1 arranged at a radially outermost area of the indented receiving portion 131b for receiving the disk contacting portion 132b of the cone shaped member 132, a second accommodating portion 131b2 arranged radially inward of the first accommodating portion 131b1 making contact with the elastic member 133, and a third accommodating portion 131b3 arranged radially inward of the second accommodating portion 131b2 for receiving the slidable portion 132a of the cone shaped member 132. An inner circumferential edge of the third accommodating portion 131b3 and the outer circumferential surface of the shaft 90 are affixed to one another. The first accommodating portion 131b1 is arranged axially above the other accommodating portions, while the third accommodating portion 131b3 is arranged axially lowest.

The hollow portion 131a of an annular shape in the circumferential direction is arranged at a radially outer area of the first accommodating portion 131b1. The hollow portion 131a has an opening facing axially below thereof. The hollow portion 131a includes an inner circumferential wall 131a2 at radially inward thereof, an outer circumferential wall 131a3 at radially outward thereof, and a lid surface 131a5 radially connecting the inner circumferential wall 131a2 and the outer circumferential wall 131a3. The hollow portion 131a is radially adjacent to the first accommodating portion 131b1. That is, the inner circumferential surface of the first accommodating portion 131b1 and the outer circumferential surface of the inner circumferential wall 131a2 are arranged at substantially the same position in the radial direction. Also, an axial position of the lid surface 131a5 connecting the inner circumferential wall 131a2 and the outer circumferential wall 131a3 of the hollow portion 131a is substantially the same as a bottom portion of the first accommodating portion 131b1. An inclined surface is arranged at a corner portion 131a1 at radially inward and axially upper area of the hollow portion 131a. If such inclined surface is not arranged (see a dotted line in FIG. 2) at the corner portion 131a1, a radial width of the inner circumferential wall 131a2 between the first accommodating portion 131b1 and the hollow portion 131a will be unfavorably thin, thereby severely deteriorating a flow of the resin material when injected in a mold for shaping the elements of the motor and consequently affecting the manufacturing efficiency. On the other hand, due to the inclined surface arranged at the corner portion 131a1, preferable radial width of the inner circumferential wall 131a2 will be arranged between the first accommodating portion 131b1 and the hollow portion 131a, thereby improving the flow of the resin material. The inclined surface of the corner portion 131a1 is arranged axially above a center of the steel ball. In particular, according to the preferred embodiment of the present invention an angle generated between the inclined surface of the corner portion 131a1 and the central axis J1 is approximately 45 degrees.

Also, an indent portion 131c of a substantially annular shape in the circumferential direction is arranged at the inner circumferential area of the inner circumferential wall 131a2 wherein the indent portion 131c has an opening facing axially downward.

A diameter of the outer circumferential wall 131a3 is substantially equal to the external diameter of the cylindrical portion 101 of the rotor holder 100. Also, a disk loading portion 131d radially extending off the outer circumferential wall 131a3 is arranged at an upper area of the turn table member 131. A disk mounting surface 131e of a substantially annular shape made of a material having a great frictional property (e.g., rubber) is arranged on the top surface of the disk loading portion 131d. Also, at an upper portion of the outer circumferential wall 131a3, an inclined surface extending toward the outer end of the disk mounting surface 131e is arranged.

A plate 136 of a substantially annular shape made of a thin metal plate by a deformation process (e.g., pressing) for sealing the hollow portion 131a is arranged at the opening of the hollow portion 131a axially below thereof. A hook portion 136a of a substantially cylindrical shape extending upward is arranged at a radial end of the plate 136, wherein an outer circumferential surface of the hook portion 136a and the inner circumferential surface of the inner circumferential wall 131a2 are affixed to one another by a press fit. The outer circumferential wall 131a3 includes a step portion 131a4 at the inner circumferential portion thereof whereby an outer end of the plate 136 makes contact therewith so as to determine the axial position of the plate 136. The outer circumferential wall 131a3 extends axially lower than the bottom facing surface of the plate 136. The inner circumferential surface of the outer circumferential wall 131a3 makes contact with the outer circumferential surface of the plate 136. By virtue of such configuration, the hollow portion 131a is sufficiently sealed, and therefore sound which is generated therein due to movement of the balance member 135 will well be contained. Further, since the outer circumference of the outer circumferential wall 131a3 extends axially lower than the bottom facing surface of the plate 136, the hollow portion 131a will be sufficiently sealed. Furthermore, the outer circumference of the outer circumferential wall 131a3 extends axially lower than the top surface of the lid portion 102 of the rotor holder 100.

An adjuster 137 of an annular shape made of a thin plate is arranged above the plate 136 within the hollow portion 131a in which the balance member 135 moves. The adjuster 137 absorbs the noise generated when the balance member 135 moves due to a rotary force of the rotor portion.

With reference to FIG. 3, an adhesive filling portion 131f having an opening facing axially downward is arranged on a bottom facing surface of the turn table member 131. The adhesive filling portion 131f includes a first indent portion 131f1 of a substantially annular shape, and a plurality of second indent portions 131f2 (6 in the present embodiment) each extending in the radial direction from the first indent portion 131f1. The second indent portions 131f1 each are connected to the indent portion 131c.

With reference to FIG. 3, the first indent portion 131f1 is axially opposed to a portion of the lid portion 102. By virtue of such configuration, the turn table member 131 and the lid portion 102 are securely affixed to one another via adhesive. Further, since the second indent portions 131f2 are connected to the first indent portion 131f1, any amount of adhesive in excess of the space generated between the first indent portion 131f1 and the lid portion 102 will flow to the second indent portion 131f2.

The disk contacting portion 132b of the cone shaped member 132 is shaped such as to make contact with a substantially entire inner circumferential surface of the central opening of the optical disk (not shown). An outer circumferential surface of the disk contacting portion 132b includes at a top portion thereof a disk guiding surface 132b1 which makes contact with the inner circumferential surface or a bottom surface of the central opening of the optical disk and guides the optical disk toward a center of rotation of the brushless motor, and at a bottom portion thereof disk aligning surface 132b2 which is connected with the disk guiding surface 132b1 and aligns the rotation of the disk with that of the brushless motor. An inner wall 132b3 of a substantially annular shape extending in the axial direction is arranged radially inward of the disk contacting portion 132b. A connecting portion 132c extending radially inward is arranged so as to connect the inner wall 132b3 with the slidable portion 132a. An annular open portion 132b4 is arranged radially between the inner wall 132b3 and the disk aligning surface 132b2. The elastic member 133 which is compressed to a predetermined level is arranged so as to make contact with a bottom surface of the annular open portion 132b4 and a top surface of the second accommodating portion 131b2.

Also, since the disk aligning surface 132b2 makes contact with a substantially entire inner circumferential surface of the central opening of the optical disk, aligning quality of the disk with brushless motor and the retaining strength of the optical disk will be improved.

Also, since a step portion 103 is arranged at a portion connecting the lid portion 102 and the cylindrical portion 101 of the rotor holder 100, wherein the rotor holder 100 is radially indented, deformation of the lid portion 102 which lacks rigidity particularly at the joint thereof with the cylindrical portion 101 will be minimized.

Also, the hollow portion 131a is arranged at an outer circumferential area of the lid portion 102 and the plate 136 makes contact with the lid portion 102. Also, since the step portion 103 is arranged at the outer circumferential area of the lid portion 102 minimizing the risk of deforming the lid portion 102, deformation of the plate 136 caused due to the deformation of the lid portion 102 will be minimized. By virtue of such configuration, the preferred embodiment of the present invention is able to reduce the level of vibration and noise caused due to deformation of the travel passage of the balance member 135 which is caused by deformation of the lid portion 102.

Also, an outer circumferential area of the outer circumferential wall 131a3 of the hollow portion 131a and the step portion 103 are arranged at substantially the same position in the radial direction, while a bottom end of the outer circumferential wall 131a3 is arranged axially below the top surface of the lid portion 102. By virtue of such configuration, the bottom end of the outer circumferential wall 131a3 will make no contact with the lid portion 102, and therefore, while the radial position of the outer circumferential wall 131a3 is same as that of the cylindrical portion 101 of the rotor holder 100, the lid portion 102 and the plate 136 make contact with one another in a preferable manner.

Figure 4:
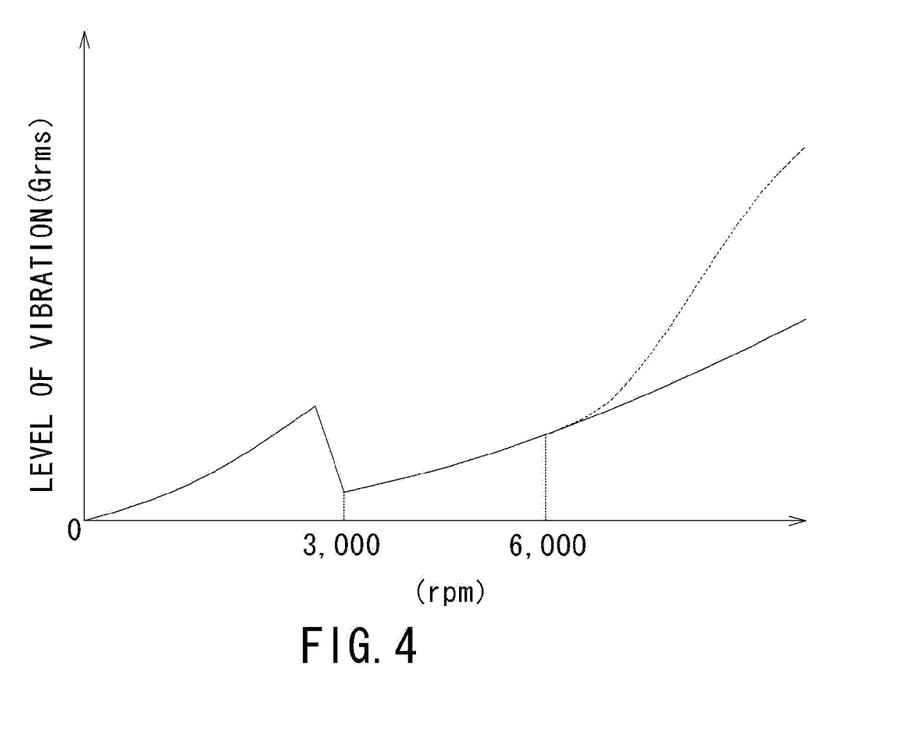
FIG. 4 is a graph showing a level of vibration with respect to rpm of the brushless motor according to the preferred embodiment of the present invention and that of a conventional brushless motor.

Hereinafter, a comparison will be made with reference to FIG. 4 between a level of vibration with respect to rpm of the brushless motor according to the preferred embodiment of the present invention and that of a conventional brushless motor which includes a balance member having a plurality of aligning claws are arranged in the circumferential direction. FIG. 4 is a diagram showing a level of vibration with respect to rpm of the brushless motor according to the preferred embodiment of the present invention and that of the conventional brushless motor. Note that the horizontal axis of the diagram indicates rpm and the axial axis indicates the level of vibration (Grms). Also note that the value for the vibration with respect to rpm of the brushless motor according to the preferred embodiment of the present invention is denoted by a solid line, while that of the conventional brushless motor is denoted by a dotted line.

According to FIG. 4, the level of vibration shifts in a uniformed manner for both brushless motor of the present invention and the conventional brushless motor until rpm reaches approximately 3,000 at which point the level of vibration drops which indicates that the balance member (steel balls) is arranged at an appropriate position of each motor. When rpm reaches approximately 6,000, the difference between the brushless motor according to the preferred embodiment of the present invention and the conventional brushless motor becomes apparent where the level of vibration for the conventional brushless motor becomes greater than that of the brushless motor according to the preferred embodiment of the present invention. This indicates that at approximately 6,000 rpm and thereafter a centrifugal force originally generated due to an imbalance of the optical disk forcing the optical disk to be removed from the chucking mechanism becomes greater than a retaining strength of the aligning claws of the conventional brushless motor, thereby misaligning the optical disk. That is, the rotation of the optical disk will be misaligned from the rotation of the brushless motor. Consequently, the greater the misalignment between the optical disk and the brushless motor, the greater the level of the vibration of the brushless motor becomes. On the other hand, the cone shaped member 132 of the brushless motor according to the preferred embodiment of the present invention makes contact with substantially the entire inner circumferential surface of the central opening of the optical disk and therefore, the optical disk will be retained more securely. Consequently, as shown in FIG. 4, misalignment of the optical disk is minimized even at 6,000 rpm for the brushless motor according to the preferred embodiment of the present invention. Thus, the brushless motor according to the preferred embodiment of the present invention is suitable for recording data on the optical disk and reproducing data from the optical disk when the rotation of the optical disk reaches approximately 6,000 or higher.

Disk Driving Device

Figure 5:
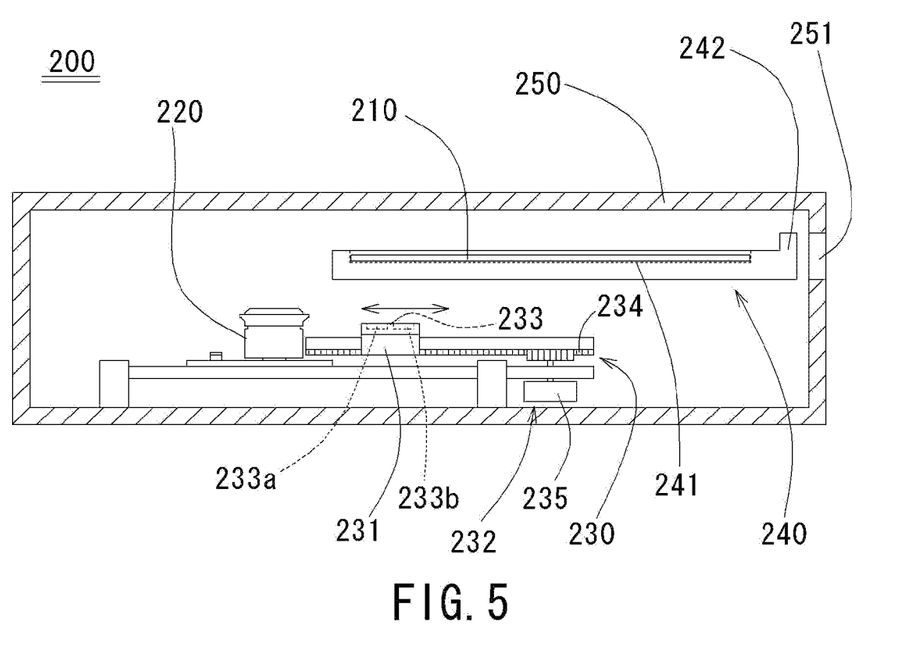
FIG. 5 is a schematic cross sectional view of disk driving device according to a preferred embodiment of the present invention.
Figure 6A:
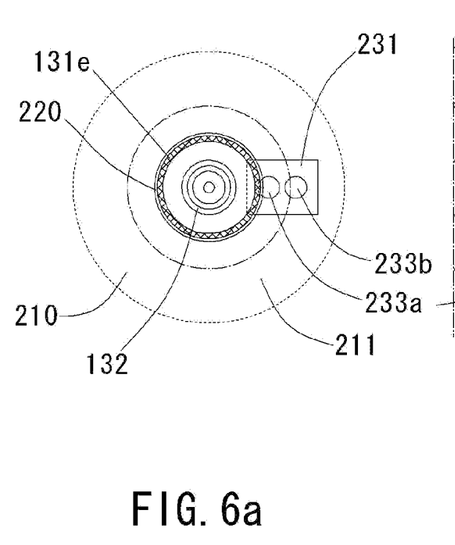
FIG. 6a is a plan view of an optical pick up mechanism.
Figure 6B:
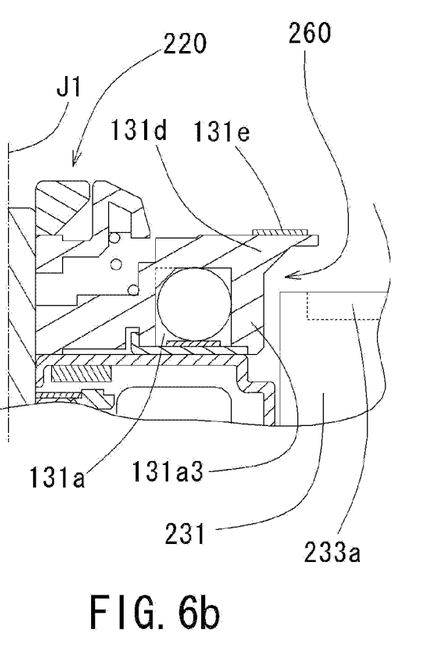
FIG. 6b is a schematic cross sectional view of the chucking mechanism provided to illustrate a positional relationship between the optical pick up mechanism shown in FIG. 6a and the chucking mechanism.

Hereinafter, a disk driving device according to the preferred embodiment of the present invention will be described with reference to FIGS. 5, 6a and 6b. FIG. 5 is a schematic cross sectional view of the disk driving device. FIG. 6a is a plan view of an optical pick up mechanism. FIG. 6b is a schematic cross sectional view of the chucking mechanism provided to illustrate a positional relationship between the optical pick up mechanism shown in FIG. 6a and the chucking mechanism.

According to FIG. 5, a disk driving device 200 includes a brushless motor 220 for rotating an optical disk 210, an optical pickup mechanism 230, for recording on the optical disk 210 and reproducing data from the optical disk 210, which moves freely in the radial direction within a predetermined circumferential direction, a loading mechanism 240 for loading and unloading the optical disk 210 to the disk driving device 200, and a housing 250 of a cuboid shape for accommodating therein the brushless motor 220, the optical pickup mechanism 230 and the loading mechanism 240.

The loading mechanism 240 is arranged axially above the brushless motor 220 and includes a disk accommodating portion 241 having a concaved area facing axially upward on which the optical disk 210 is to be loaded. The loading mechanism 240 includes at a radially outermost portion thereof an outer wall 242 which becomes a portion of the housing 250. When the loading mechanism 240 shifts such that the outer wall 242 aligns with the housing 250 in the axial direction, the center of rotation of the brushless motor 220 aligns with the center of the central opening of the optical disk 210.

The optical pickup mechanism 230 includes a recording/reproducing portion 231 for recording data on the optical disk 231 and reproducing data from the optical disk 210, and an optical pick up moving portion 232 for moving the recording/reproducing portion 231 in the radial direction. The recording/reproducing portion 231 includes two object lenses 233 in the radial direction. One of the object lenses 233 arranged nearer to the brushless motor will be referred to as a first lens 233a and the other lens will be referred to as a second lens 233b. These two lenses 233 will be used when recording data on and reproducing data from different types of optical disk (e.g., HD-DVD and Blu-ray disk). Also, the optical pick up transport portion 232 includes a plurality of gear mechanisms 234 which engage with the recording/reproducing portion 231 and a gear driving motor 235 for driving the gear mechanism 234.

The housing 250 includes an opening portion 251 allowing the loading mechanism 240 to move therethrough.

Hereinafter, a positional relationship between the recording/reproducing portion 231 and the brushless motor 220 will be described with reference to FIGS. 6a and 6b. In FIG. 6a, a dotted line denotes the optical disk 210 while an alternate short and long line broken line denotes a radially inner most portion of a recordable and reproducible region of the optical disk 210.

When the second lens 233b of the recording/reproducing portion 231 is used to reproduce the data stored at an area further radially inward of a recording/reproducing area 211 which is an area of the optical disk 210, the first lens 233a will be at an area very close to the brushless motor 220 (i.e., further inward of the recording/reproducing area 211). Therefore, a space to accommodate a portion of the recording/reproducing portion 231 will be required underneath the disk loading portion 131d. According to the brushless motor 210 of the present invention, the outer circumferential wall 131a3 of the hollow portion 131a which is underneath the disk loading portion 131d is arranged at an area radially inward of the disk mounting surface 131e, and therefore, a space (accommodating portion 260) to accommodate therein the portion of the storing/reproducing portion 231 is arranged. By virtue of such configuration, it becomes possible to execute a recording and reproducing of data at the area further radially inward of the recording/reproducing area 211.

As an embodiment, the turn table member 131 has a through hole 131a21. The turn table member 131 has an indented receiving portion 131b radially outside the through hole 131a21. The indented receiving portion 131b has a first accommodating portion 131b1 having a first accommodating surface 131a17 extending axially, and a second accommodating portion 131b2 having a second accommodating surface 131a16 extending radially. The second accommodating portion is located radially inside, and lower than, the first accommodating portion 131a17. The turn table member 131 has an uppermost surface 131a22 radially outside the indented receiving portion 131bb. The turn table member 131 has a first groove of a substantially annular shape in the turn table member 131. The first groove has an inner annular surface 131a11 extending axially, an outer annular surface 131a13 extending axially. An upper annular surface 131a12 extends radially and a corner annular surface 131a14 extends from the inner annular surface 131a11 toward the upper annular surface 131a12 in an inclined manner. At least one balance member 135 is accommodated in the annular groove. A cone shaped member 132 is arranged above the turn table member 131. The cone shaped member 132 has a slidable surface 132a' movable along the shaft 90. The cone shaped member 132 has the disc contacting portion 132b radially outside the slidable surface 132a'. The disc contacting portion 132b has a disc aligning surface 132b2 extending downward.

Figure 8:
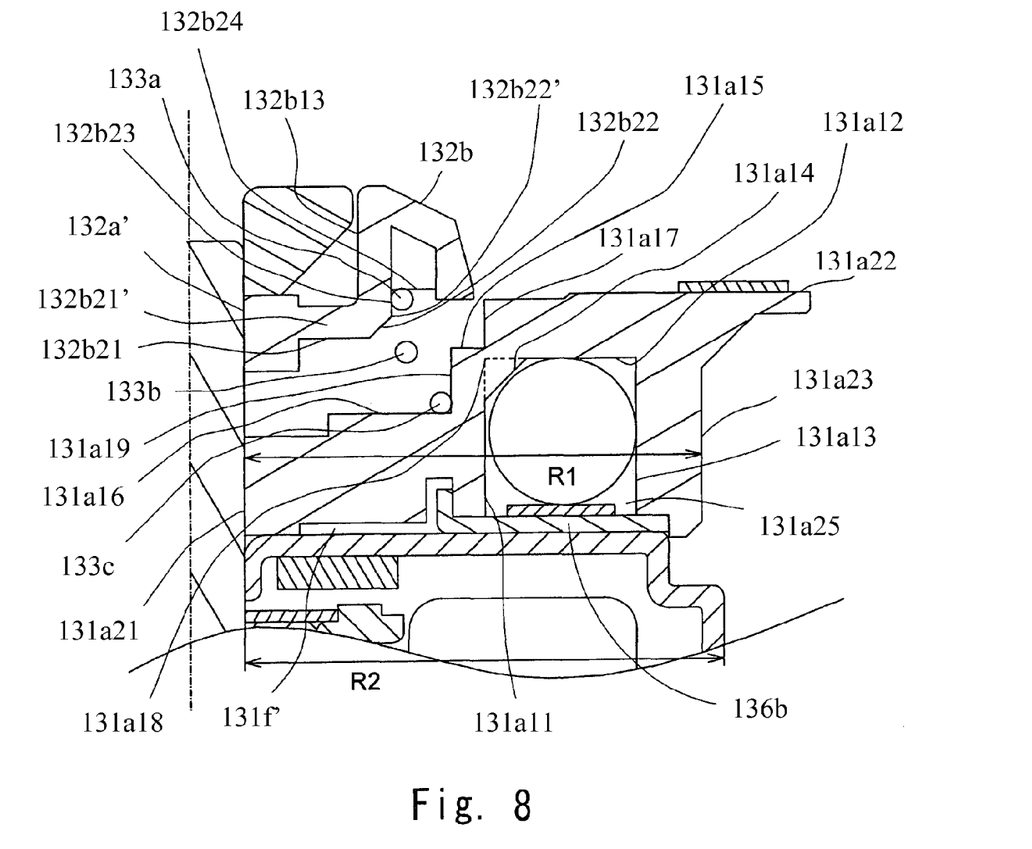
FIG. 8 is an enlarged and cross sectional view of a chucking mechanism and an upper portion of a rotor portion of the brushless motor according to the embodiment of the present invention.

As shown in FIG. 8, the disc contacting portion 132b has an upward surface 132b13 extending upward. The turn table 131 has an outer circumferential surface 131a23 radially outside the annular groove. The radial distance R1 between the shaft 90 and the outer circumferential surface is the same as, or shorter than, the radial distance R2 between the shaft 90 and the cylindrical portion 101.

Figure 9:
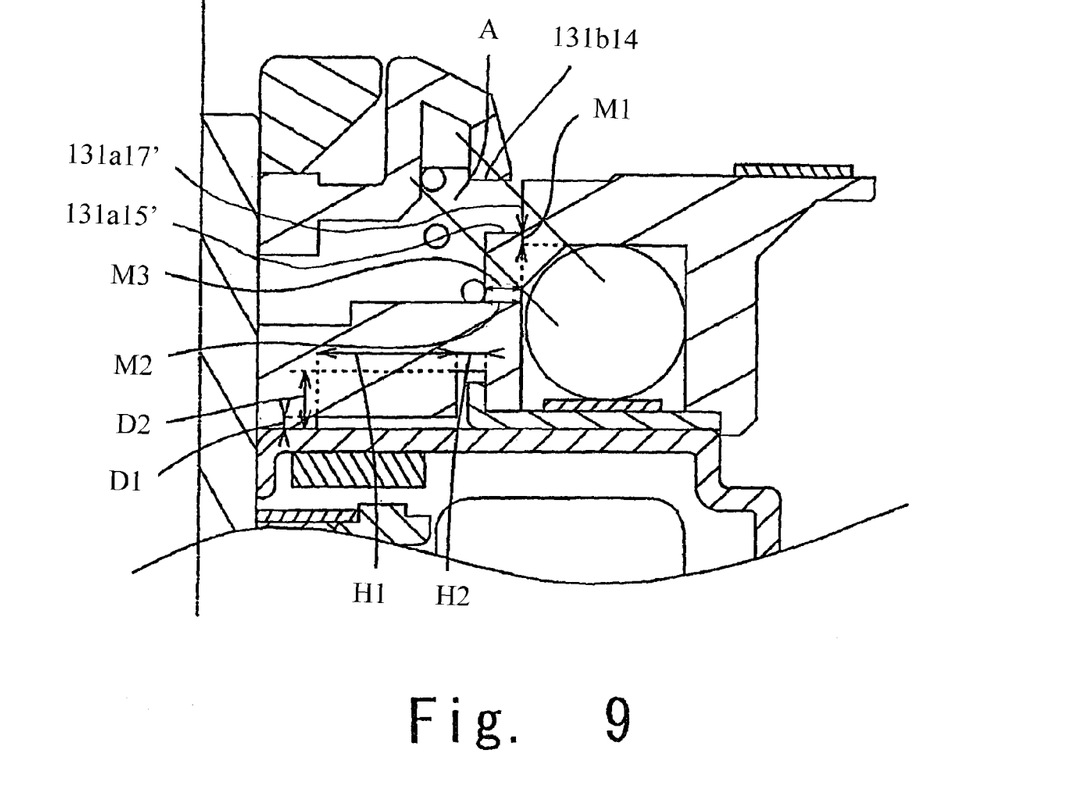
FIG. 9 is an enlarged and cross sectional view of a chucking mechanism and an upper portion of a rotor portion of the brushless motor according to the embodiment of the present invention.

As illustrated in FIGS. 8 and 9, the minimum distance M1 between the first accommodating surface 131a17 and a hypothetical corner 131a18 made by extension of the inner annular surface 131a11 and the upper annular surface 131a12 is shorter than the minimum distance M2 between the inner annular surface 131a11 and the second accommodating surface 131a16.

As shown in FIG. 8, the first accommodating portion 131b1 has a third accommodating surface 131a15. The second accommodating portion 131b2 has a fourth accommodating surface 131a19.

As shown in FIG. 9, the minimum distance M1 between the first accommodating surface 131a17 and the hypothetical corner 131a18 made by extension of the inner annular surface 131a11 and the upper annular surface 131a12 is shorter than a minimum distance M3 between the inner annular surface 131a11 and the fourth accommodating surface 131a19.

As shown in FIG. 9, a part 131a17' of the first accommodating surface 131b1 is located within an area A perpendicularly extending from the corner annular surface 131a14.

As shown in FIGS. 8 and 9, the disc contacting portion 132b has an end surface 131b14, the end surface 131b14 opposing to the second accommodating surface 131a16. The first accommodating portion 131b1 has the third accommodating surface 131a15 extending radially. A part 131a15' of the third accommodating surface 131a15 is located within an area A perpendicularly extending from the corner annular surface 131a14. The elastic member 133 has turns 133a, 133b and 133c.

As shown in FIG. 8, the cone shaped member 132 has a horizontal extension portion 132b21' provided between the slidable surface 132a' and the disc contacting portion 132b. The cone shaped member 132 has a first surface 132b21, a second surface 132b22, a third surface 132b23 and a fourth surface 132b24. The second surface has a radially outer end 132b22'.

Figure 10:
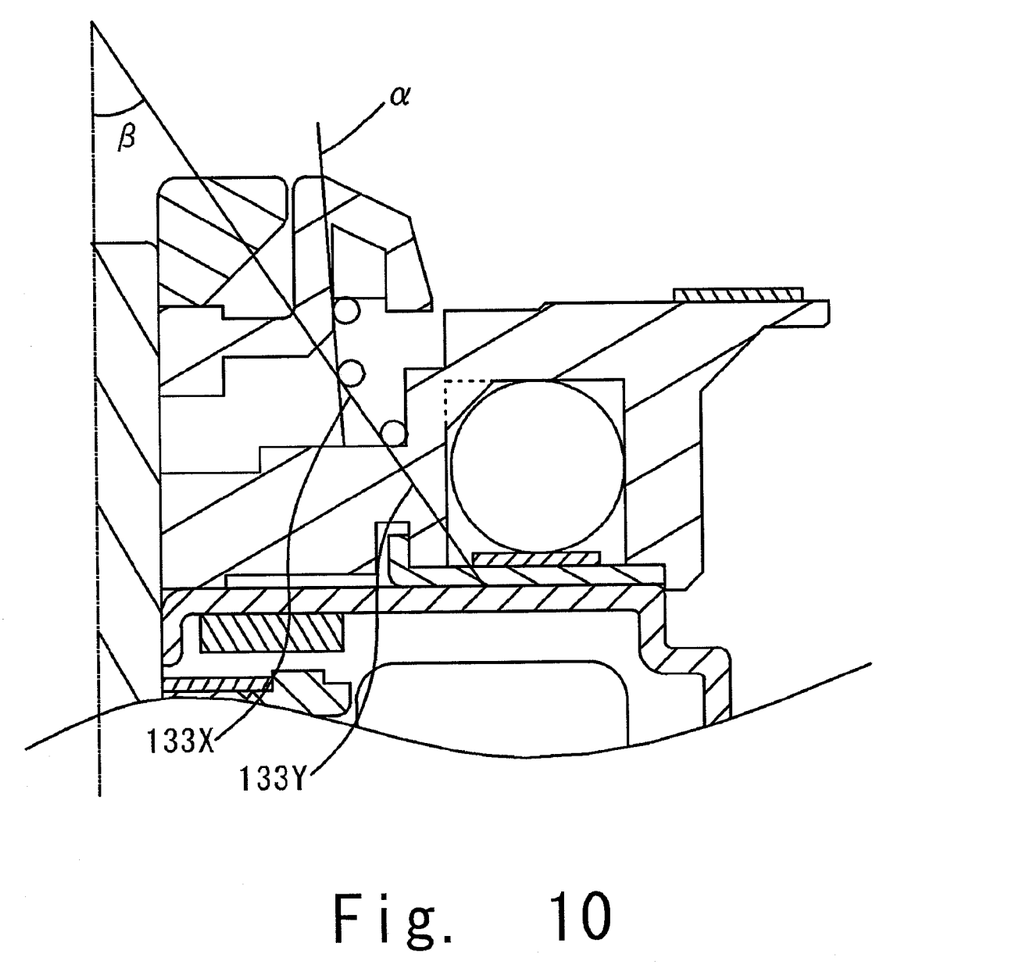
FIG. 10 is an enlarged and cross sectional view of a chucking mechanism and an upper portion of a rotor portion of the brushless motor according to the embodiment of the present invention.

As shown in FIG. 10, when viewed in a cross-sectional view including an axis of the shaft 90, a first angle α formed between the axis and a first line 133x running through inner peripheries of the turn 133a and the turn 133b is smaller than a second angle β formed between the axis and a second line 133y running through that of the turn 133b and the turn 133c.

As shown in FIG. 8, an adhesive filling space 131f' is radially inside the first groove of a substantially annular shape that is provided in the turn table member 131.

As shown in FIG. 2, the adhesive filling portion 131f has the first indent portion 131f1; and the second indent portions 131f2 radially outside the first indent portion. As shown in FIG. 9, the first indent portion 131f1 has a first axial depth D1. The second indent portion 131f2 has a second axial depth D2. The second axial depth D2 is larger than the first axial depth D1. The second indent portion 131f2 accommodates the hook portion 136a of the plate 136. The first indent portion 131f1 has a first radial length H1. The second indent portion 131f2 has a second radial length H2. The second radial length H2 is smaller than the first radial length H1.

As shown in FIGS. 2 and 8, the groove having an opening 131a25 is closed by the plate 136 with the hook portion 136a. The plate 136 has an annular body 136b extending radially, and the hook portion 136a extending upward from an inner end of the annular body 136b. The hook portion 136a is accommodated in the adhesive filling portion 131f.

While the invention has been described in detail, the foregoing description is in all aspects illustrative and not restrictive. It is understood that numerous other modifications and variations can be devised without departing from the scope of the invention.

For example, although the present embodiment assumes that the inclined surface of the corner portion 131a1 of the turn table member 131 to be flat, the present invention is not limited thereto; the inclined surface can be curved with respect to the axial direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A brushless motor having a chucking mechanism operable to detachably place thereon an optical disk including a central opening portion, the brushless motor comprising:
   a shaft being a central axis;
   a rotor magnet rotating along with the shaft; and
   a rotor holder including therein a cylindrical portion retaining the rotor magnet and a flat lid portion extending from the cylindrical portion to the shaft,
   wherein the chucking mechanism is arranged on a top surface of the lid portion, and the chucking mechanism includes:
   a cone shaped member having a slidable portion of a substantially cylindrical shape with an inner circumferential surface movable in an axial direction with respect to the shaft, and a disk contacting portion of a substantially annular shape expanding downwardly in the axial direction making contact with an inner circumferential surface of the central opening portion;
   a turn table member having a disk mounting surface making contact with a bottom surface of the optical disk, a hollow portion arranged axially below the disk mounting surface, having a substantially annular shape with an opening facing downward, an inner circumferential wall and an outer circumferential wall, and at least one balance member accommodated in the hollow portion;
   an elastic member, arranged at an axial space between the turn table member and the cone shaped member, retaining an axial position of the cone shaped member; and
   a yoke member arranged axially above the slidable portion restricting axial movement of the cone shaped member, and
   wherein an outer circumferential surface of the outer circumferential wall is arranged radially at a same position as the cylindrical portion or radially inward of the cylindrical portion,
   wherein an adhesive is arranged at an axial space between the turn table member and the rotor holder, the turn table includes, at a portion thereof opposite to the top surface of the lid portion, a hollow portion having an opening facing axially downward, and an adhesive is arranged between the top surface of the lid portion and the hollow portion.

2. The brushless motor according to claim 1, wherein the hollow portion includes a first hollow portion of a substantially annular shape, and a plurality of second hollow portions radially extending from the first hollow portion arranged in a circumferential direction.

3. A brushless motor having a chucking mechanism operable to detachably place thereon an optical disk including a central opening portion, the brushless motor comprising:
   a shaft having an axis;
   a rotor magnet rotating along with the shaft;
   a rotor holder held by the shaft, the rotor holder including a cylindrical portion retaining the rotor magnet;
   a turn table member on the rotor holder, wherein the turn table member comprises:
   a through hole;
   an indented receiving portion radially outside the through hole, the indented receiving portion comprising: a first accommodating portion having a first accommodating surface extending axially; and a second accommodating portion having a second accommodating surface extending radially, the second accommodating portion being located radially inside, and lower than, the first accommodating portion;
   an uppermost surface radially outside the indented receiving portion;
   a first groove of a substantially annular shape in the turn table member, wherein the first groove has an inner annular surface extending axially, an outer annular surface extending axially, an upper annular surface extending radially and a corner annular surface extending from the inner annular surface toward the upper annular surface in an inclined manner, wherein at least one balance member is accommodated in the annular groove; and
   a cone shaped member arranged above the turn table member, wherein the cone shaped member comprises:
   a slidable surface movable along the shaft; and
   a disc contacting portion radially outside the slidable surface, the disc contacting portion comprising a disc aligning surface extending downward, wherein the disc aligning surface is able to align the optical disc in operation, and
a yoke member arranged above the slidable surface,
wherein the disc contacting portion further comprises: an upward surface extending upward; and a disc guiding surface radially outside the upward surface and extending downward; the disc guiding surface radially inside the disc aligning surface, wherein the disc aligning surface is steeper than the disc guiding surface;
wherein an elastic member is arranged between the turn table member and the cone shaped member;
wherein the turn table has an outer circumferential surface radially outside the annular groove, wherein the cylindrical portion and the outer circumferential surface are located radially close to the shaft such that an optical lens not in operation of an optical pickup mechanism is accommodated radially inside a recordable and reproducible region of the optical disc.

4. A brushless motor having a chucking mechanism operable to detachably place thereon an optical disk including a central opening portion, the brushless motor comprising:
a shaft having an axis;
a rotor magnet rotating along with the shaft;
a rotor holder held by the shaft, the rotor holder comprising a lid portion extending radially from the shaft, and a cylindrical portion extending axially from the lid portion, the cylindrical portion retaining the rotor magnet;
a turn table member on the rotor holder, wherein the turn table comprises:
a through hole;
an indented receiving portion radially outside the through hole;
an uppermost surface radially outside the indented receiving portion; and
a first groove of a substantially annular shape provided in the turn table member, wherein at least one balance member is accommodated in the first groove;
an adhesive filling space radially inside the first groove, an adhesive in the adhesive filling space securing the turn table to the lid portion of the rotor holder;
a cone shaped member arranged above the turn table member, the cone shaped member being a single piece member, the cone shaped member being able to align the optical disc in operation,; and
a yoke member arranged above a slidable portion of the cone shaped member.

5. A brushless motor according to claim 4, wherein an elastic member is arranged between the turn table member and the cone shaped member.

6. A brushless motor according to claim 5, wherein the adhesive filling space comprises: a first indent portion; and a second indent portion radially outside the first indent portion, wherein the second indent portion accommodates a hook portion of a plate.

7. A brushless motor according to claim 5, wherein the adhesive filling space comprises: a first indent portion; and a second indent portion radially outside the first indent portion, the first indent portion having a first axial depth, the second indent portion having a second axial depth, the second axial depth being larger than the first axial depth,
wherein the second indent portion accommodates a hook portion of a plate.

8. A brushless motor according to claim 5, wherein the adhesive filling space comprises: a first indent portion; and a second indent portion radially outside the first indent portion, the first indent portion having a first radial length, the second indent portion having a second radial length, the second radial length being smaller than the first radial length,
wherein the second indent portion accommodates a hook portion of a plate.

9. A brushless motor according to claim 5, wherein the first groove has an opening which is closed by a plate with a hook portion, wherein the hook portion is accommodated in the adhesive filling space.

10. A brushless motor according to claim 5, wherein the first groove has an opening closed by a plate,
wherein the plate comprises: an annular body extending radially; and a hook portion extending upward from an inner end of the annular body,
wherein the hook portion is accommodated in the adhesive filling space.

11. A brushless motor according to claim 4, wherein the through hole contacts the shaft.

12. A brushless motor according to claim 4, wherein the turn table member is a single piece member.

13. A brushless motor according to claim 4, wherein the cone shaped member comprises:
a horizontal extension portion provided between a slidable surface and a disc contacting portion, wherein an upper end of the slidable surface is located above the horizontal extension portion.

14. A brushless motor according to claim 4, wherein the cone shaped member further comprises:
a slidable portion having a slidable surface;
a horizontal extension portion provided between the slidable portion and a disc contacting portion, wherein an upper end of the slidable surface is located above the horizontal extension portion, wherein the slidable portion abuts the yoke member when the cone shaped member takes its uppermost position.

15. A brushless motor having a chucking mechanism operable to detachably place thereon an optical disk including a central opening portion, the brushless motor comprising:
a shaft having an axis;
a rotor magnet rotating along with the shaft;
a rotor holder held by the shaft, the rotor holder comprising a lid portion extending from the shaft and a cylindrical portion extending axially, the cylindrical portion retaining the rotor magnet;
a turn table member on the rotor holder, wherein the turn table comprises:
a through hole;
an indented receiving portion radially outside the through hole;
an uppermost surface radially outside the indented receiving portion;
a first groove of a substantially annular shape provided in the turn table member, wherein at least one balance member is accommodated in the first groove;
a second groove radially inside the first groove,
a plate comprising an annular body extending radially; and a hook portion extending upward from an inner end of the annular body, the annular body closing the first groove, the hook portion being accommodated in the second groove; and
an adhesive provided radially inside the second groove, the adhesive securing the turn table to the lid portion of the rotor holder;
a cone shaped member arranged above the turn table member, the cone shaped member being a single piece member, the cone shaped member being able to align the optical disc in operation; and a yoke member arranged above a slidable portion of the cone shaped member.

16. A brushless motor according to claim 15, wherein an elastic member arranged between the turn table member and the cone shaped member.

17. A brushless motor according to claim 15, wherein the adhesive is provided in a third groove radially inside the second groove.

18. A brushless motor according to claim 17, wherein the second groove has a second axial depth, wherein the third groove has a first axial depth, the second axial depth being larger than the first axial depth.

19. A brushless motor according to claim 17, wherein the second groove has a second radial length, wherein the third groove has a first radial length, the second radial length being smaller than the first radial length.

20. A brushless motor according to claim 15, wherein the through hole contacts the shaft.

21. A brushless motor according to claim 15, wherein the turn table member is single piece member.

22. A brushless motor according to claim 15, wherein the cone shaped member further comprises:
   a horizontal extension portion provided between a slidable surface and a disc contacting portion, wherein an upper end of the slidable surface is located above the horizontal extension portion.

23. A brushless motor according to claim 15, wherein the cone shaped member further comprises:
   a slidable portion having a slidable surface;
   a horizontal extension portion provided between the slidable portion and a disc contacting portion, wherein an upper end of the slidable surface is located above the horizontal extension portion, wherein the slidable portion abuts the yoke member when the cone shaped member takes its uppermost position.

* * * * *